United States Patent
Spitz

(10) Patent No.: US 9,582,684 B2
(45) Date of Patent: Feb. 28, 2017

(54) METHOD FOR CONFIGURING AN APPLICATION FOR AN END DEVICE

(75) Inventor: Stephan Spitz, Karlsfeld (DE)

(73) Assignee: Giesecke & Devrient GmbH, Munich (DE)

( * ) Notice: Subject to any disclaimer, the term of this patent is extended or adjusted under 35 U.S.C. 154(b) by 58 days.

(21) Appl. No.: 13/642,978

(22) PCT Filed: Apr. 21, 2011

(86) PCT No.: PCT/EP2011/002046
§ 371 (c)(1),
(2), (4) Date: Oct. 23, 2012

(87) PCT Pub. No.: WO2011/131365
PCT Pub. Date: Oct. 27, 2011

(65) Prior Publication Data
US 2013/0042300 A1 Feb. 14, 2013

(30) Foreign Application Priority Data

Apr. 23, 2010 (DE) .................. 10 2010 018 021

(51) Int. Cl.
*G06F 21/00* (2013.01)
*G06F 21/62* (2013.01)

(52) U.S. Cl.
CPC .... *G06F 21/629* (2013.01); *G06F 2221/2113* (2013.01); *G06F 2221/2149* (2013.01)

(58) Field of Classification Search
CPC ....... H04L 63/20; H04L 63/10; H04L 63/102; H04L 67/306; G06F 21/60; G06F 21/31;
(Continued)

(56) References Cited

U.S. PATENT DOCUMENTS 6,098,098 A   8/2000   Sandahl et al.
6,122,741 A *   9/2000   Patterson et al. ............... 726/17
(Continued)

FOREIGN PATENT DOCUMENTS

DE   10 2005 05657 A1   5/2007
DE   10 2007 051 440 A1   4/2009
(Continued)

OTHER PUBLICATIONS

"8-0 Creating Secure Channels." Internet Archive. N.p., Feb. 12, 2005. Web. http://web.archive.org/web/20050212031914/http://aker.alpha.ru/Manual_FW/en50-08.htm 1 Page.*
(Continued)

*Primary Examiner* — Farid Homayounmehr
*Assistant Examiner* — Christopher C Harris
(74) *Attorney, Agent, or Firm* — Workman Nydegger

(57) ABSTRACT

A method for configuring an application for an end device having a predefined end-device configuration with a predefined security level. A query about the predefined end-device configuration is directed by means of the application to a central place in which a multiplicity of security levels of end-device configurations have respective application configurations associated therewith. In response to the query, the central place ascertains the predefined security level of the predefined end-device configuration from the multiplicity of security levels, and outputs it to the application together with the associated application configuration. In dependence on the output security level, one or several functions of the application are configured by means of the application on the basis of the output application configuration for the end device.

15 Claims, 2 Drawing Sheets

(58) Field of Classification Search
CPC .... G06F 21/6218; G06F 21/577; G06F 21/00; G06F 21/52; G06F 21/54; G06F 21/62; G06F 2221/2149; G06F 21/53
See application file for complete search history.

(56) References Cited

U.S. PATENT DOCUMENTS

| | | | |
|---|---|---|---|
| 6,487,665 B1* | 11/2002 | Andrews et al. | 726/26 |
| 6,587,874 B1 | 7/2003 | Golla et al. | |
| 7,865,952 B1* | 1/2011 | Hopwood et al. | 726/22 |
| 7,925,874 B1* | 4/2011 | Zaitsev | G06F 9/44505 713/1 |
| 8,347,263 B1* | 1/2013 | Offer | G06F 8/71 717/104 |
| 8,555,071 B2* | 10/2013 | Choi | 713/176 |
| 2001/0027527 A1* | 10/2001 | Khidekel et al. | 713/201 |
| 2003/0115150 A1* | 6/2003 | Hamilton et al. | 705/64 |
| 2004/0088413 A1* | 5/2004 | Bhogi et al. | 709/226 |
| 2005/0256878 A1* | 11/2005 | Brown et al. | 707/10 |
| 2007/0113090 A1* | 5/2007 | Villela | H04L 9/3247 713/170 |
| 2007/0143824 A1* | 6/2007 | Shahbazi | 726/1 |
| 2008/0270302 A1 | 10/2008 | Beenau et al. | |
| 2008/0305766 A1* | 12/2008 | Falk | 455/410 |
| 2009/0018924 A1 | 1/2009 | Roberts | |
| 2010/0100939 A1* | 4/2010 | Mahaffey et al. | 726/4 |
| 2010/0186065 A1* | 7/2010 | Chung et al. | 726/1 |
| 2011/0010761 A1* | 1/2011 | Doyle | 726/5 |
| 2011/0087757 A1* | 4/2011 | Paalanen | H04L 41/082 709/219 |
| 2012/0198520 A1* | 8/2012 | Cha et al. | 726/3 |
| 2015/0282979 A1* | 10/2015 | Christenson | A61F 7/02 5/482 |

FOREIGN PATENT DOCUMENTS

| | | | | |
|---|---|---|---|---|
| EP | 1 686 775 A1 | 8/2006 | | |
| WO | WO 2008118367 A1 * | 10/2008 | | G06F 8/64 |

OTHER PUBLICATIONS

Secure Channel. Wikipedia. Wikimedia Foundation, Feb. 9, 2006. Web. <http://en.wikipedia.org/w/index.php?title=Secure_channel&oldid=38896070>.*
ISR in PTC/EP2011/002046, mailed Jul. 6, 2011 (3 pages).
International Preliminary Report on Patentability and Written Opinion in PCT/EP2011/002046 issued Oct. 23, 2012.

* cited by examiner

METHOD FOR CONFIGURING AN APPLICATION FOR AN END DEVICE

BACKGROUND OF THE INVENTION

A. Field of the Invention

This invention relates to a method for configuring an application for an end device and to a corresponding system for configuring an application. Further, the invention relates to a server and an end device for use in a method for configuring an application.

B. Related Art

For securing applications carried out using end devices, for example within the framework of a cashless payment operation or of an electronic acquisition of tickets, there can be implemented, according to the prior art, different end-device configurations on the basis of different security solutions on the end device. It proves to be disadvantageous here that separate applications must be used for the different end-device configurations. This makes it necessary for different versions of the corresponding application to be made available by the operator of the application.

The object of the invention is to configure an application for an end device in dependence on the security solution on the end device in a simple manner.

SUMMARY OF THE DISCLOSURE

The method according to the invention serves for configuring an application for an end device having a predefined end-device configuration with an associated security level. A security level here represents a measure of the security of the end-device configuration with respect to attacks by unauthorized third parties. An end-device configuration relates in particular to a runtime environment in which the corresponding application is executed. Examples of such runtime environments are secure runtime environments in a microprocessor of the end device (e.g. a TrustZone) and/or one or several security elements (or "secure elements") which can be realized e.g. as a SIM/USIM module in a mobile radio device or as a separate μSD card. An end device for the purposes of the invention can relate to an arbitrary communication device. In a preferred embodiment, the end device is a mobile end device, for example in the form of a mobile telephone or a mobile computer (notebook, netbook).

In the method according to the invention, in a step a) a query about the predefined end-device configuration is directed (sent) by means of the application to a central place in which a multiplicity of security levels of end-device configurations have respective application configurations associated therewith. The central place, in response to the query, selects the predefined security level of the predefined end-device configuration from the multiplicity of security levels. The application configuration associated with the ascertained, predefined security level is output by the central place to the application. Subsequently, in a step b) one or several functions of the application are configured (e.g. enabled) by means of the application on the basis of the output application configuration for the end device. Thus, the application is adjusted to the ascertained security level of the end-device configuration.

The method according to the invention is characterized in that an application can be configured suitably in dependence on different security levels via a central management in a central place. In so doing, one and the same application can be used for end devices with different end-device configurations. This makes it possible to save costs for different certifications. Further, the different security levels and corresponding application configurations need not be known to the end device, because they can be queried from the central place. Through this central management it is also possible to integrate new end-device configurations in the process of configuring the application in a simple manner.

In a particularly preferred embodiment, the multiplicity of security levels with associated application configurations are deposited in a table in the central place, the predefined security level of the predefined end-device configuration being ascertained from the multiplicity of security levels via a table query in step a). This variant has the advantage that common table or database query languages can be used, where applicable, for ascertaining the predefined security level.

To obtain sufficient security when carrying out the method according to the invention, the query about the predefined end-device configuration as well as the output based thereon from the central place are transferred via one or several cryptographically secured channels in step a) in a particularly preferred embodiment.

In a further variant of the method according to the invention, the end device authenticates itself with authentication data, in particular with one or several keys, the predefined security level being subsequently ascertained in the central place on the basis of the authentication data. The authentication here can be effected e.g. directly at the central place. There is also the possibility, however, that the authentication is effected on an intermediary background system which interacts with the end device via the application. Quite generally, the application can be a distributed application wherein one part of the application runs on the end device and one part of the application runs on a corresponding background system which communicates with the end device. The background system here is in particular a corresponding server.

Upon the use of a distributed application, the query about the predefined end-device configuration is preferably directed to the central place via the background system in step a). To avoid a configuration of the application by unauthorized third parties, the end device must, in a preferred embodiment, authenticate itself on the background system via authentication data before the background system can direct a query about the predefined end-device configuration to the central place. As mentioned above, the authentication data are preferably also used here for ascertaining the predefined security level of the predefined end-device configuration in the central place.

In a further embodiment of the method according to the invention, the presence of the predefined end-device configuration on the end device and/or the association of the functions of the application configured in step b) with the predefined end-device configuration is verified by the application, the configuration of the application only being completable successfully upon successful verification. This increases security with respect to attacks by third parties upon the configuration of the application, because it is always ensured that for the configured application there is always an end-device configuration provided therefor.

The functions of the application configured by the application can be arbitrarily designed. In particular, there can be configured a limit of a monetary transaction performable with the application and/or a period of validity of one or several authentication keys of the application and/or the duration of electronic tickets acquirable with the application.

Besides the above-described method, the invention relates further to a system for configuring an application for an end device. The system here comprises an end device having a predefined end-device configuration with a predefined security level, as well as a central place in which a multiplicity of security levels of end-device configurations have respective application configurations associated therewith. The system is designed here such that the method according to the invention or one or several of the above-described embodiments of the method according to the invention can be carried out in the system.

The invention relates furthermore to a server for use as a central place in the method according to the invention, a multiplicity of security levels of end-device configurations having respective application configurations associated therewith in the server, and the server being able to process a query about a predefined end-device configuration directed thereto by means of an application, such that, in response to the query, it ascertains the predefined security level of the predefined end-device configuration from the multiplicity of security levels, and outputs it to the application together with the associated application configuration.

DESCRIPTION OF THE DRAWINGS

The invention furthermore comprises an end device having a predefined end-device configuration with a predefined security level, the end device including at least a part of an application configurable for the end device by the method according to the invention or one or several embodiments of the method according to the invention.

Embodiment examples of the invention will hereinafter be described in detail with reference to the attached figures.

Figure 1:
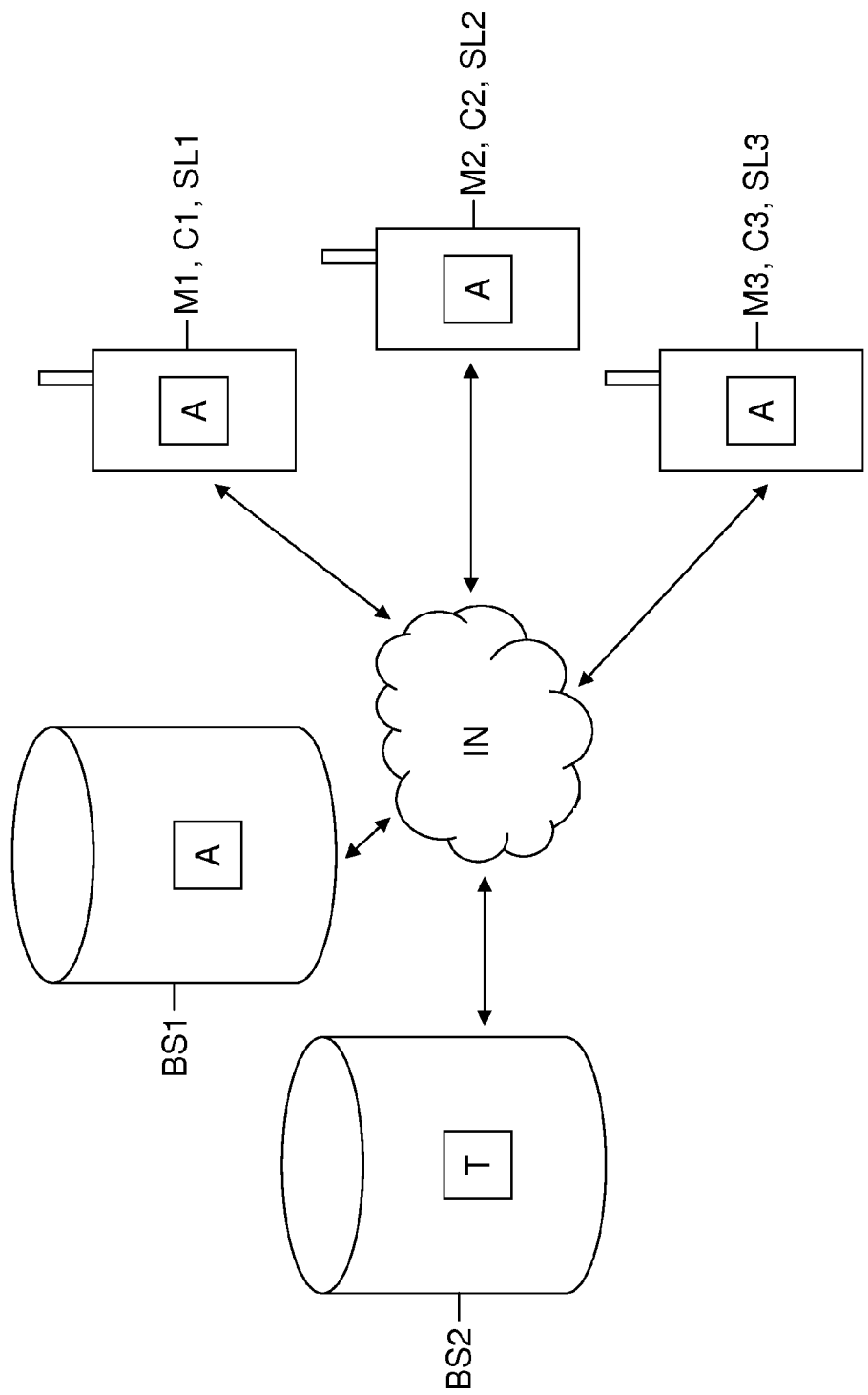
Figure 2:
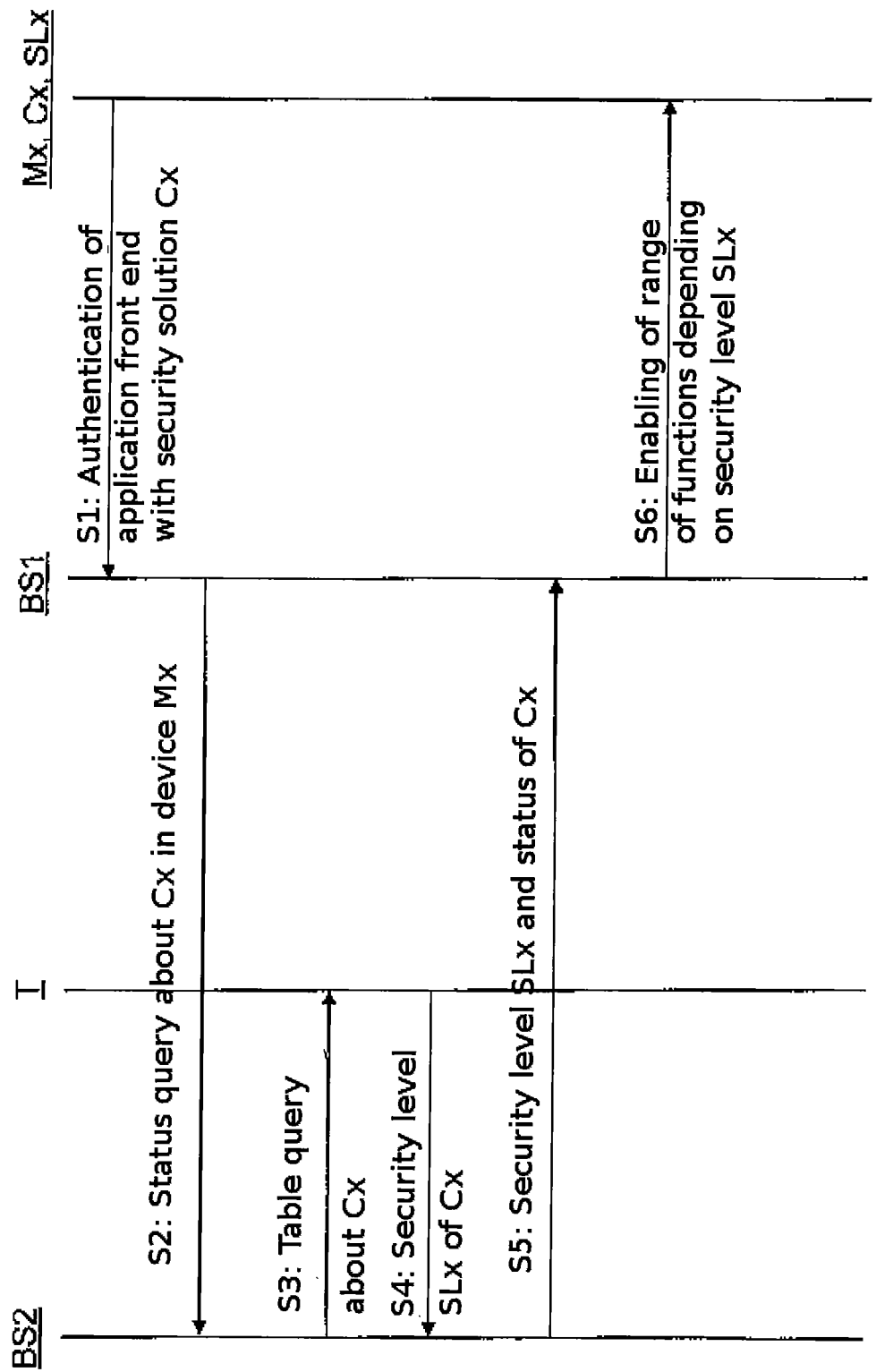

There are shown:

FIG. 1 a schematic representation of a system according to an embodiment of the invention; and FIG. 2 a schematic representation of the method steps carried out for configuring an application in the system of FIG. 1.

DETAILED DESCRIPTION

Hereinafter an embodiment of the invention will be explained on the basis of the configuration of a distributed application wherein one part of the application runs on an end device in the form of an application front end, and another part of the application, which contains an essential part of the application logic, is installed in a background system. In FIG. 1 there are represented by way of example three end devices M1, M2 and M3 which respectively contain corresponding end-device configurations C1, C2, C3. Each end-device configuration relates here to different security solutions with respect to the execution of the application on the respective mobile telephones. Such security solutions are in particular different runtime environments, for example different secure runtime environments in the microprocessor of the end device (e.g. ARM TrustZone®) or different security elements (or "secure elements"), such as e.g. the USIM/SIM card, a μSD card and the like. Each of the security solutions C1 to C3 further specifies a security grade or security level SL1, SL2 or SL3, the security level indicating how safe the corresponding security solution is from attacks by unauthorized third parties.

On each of the end devices M1 to M3 there is deposited a first part of the application A which communicates with another part of the application A running in the background system BS1. The background system can be for example the server of a bank with which a payment application is carried out between the server and the end devices. The background system communicates here by means of the application A with the individual end devices through the intermediary of the Internet IN, as indicated by corresponding double arrows. The application A is the same application for each end device, it being ensured by the method described here that the operation of the same application is also made possible for different security solutions C1 to C3. This is obtained by the applications being configured on the individual end devices suitably in dependence on the security solution used.

For configuring the respective application on the end devices M1 to M3, a central place is used in the form of a further background system BS2, which can in turn communicate via the Internet IN with the background system BS1 and also directly with the individual end devices M1 to M3, where applicable. In the central place BS2 there is deposited a table T with management information. In particular, the table respectively contains an application configuration in the form of application settings for a multiplicity of different security levels. Via the central place BS2 the background system BS1 can query, on the basis of the security solution of the corresponding end device, the associated security level of this security solution and output the corresponding application settings. Functions of the application can thereupon be enabled on the corresponding end device while using the application settings.

FIG. 2 shows a diagram making clear the sequence of the method carried out in the system of FIG. 1. Along the individual vertical lines there are represented the corresponding components of the system, namely an end device Mx with a corresponding security solution Cx and security level SLx (x=1, 2, 3), the background systems BS1 and BS2 as well as the table T in the background system BS2. In step S1 of the method, the application front end deposited on the end device Mx first authenticates itself with the background system BS1, which interacts with the application front end on the basis of the application. As mentioned above, the background system BS1 contains an essential part of the application logic. The authentication is effected on the basis of corresponding authentication data of the end device, e.g. by means of a cryptographic key which is associated with the end device Mx.

After successful authentication, the background system BS1 directs a status query about the security solution Cx of the end device Mx to the central place BS2 in step S2, the status query being effected via a cryptographically secured channel (or "secure channel") in a preferred variant. On the basis of the status query the central place BS2 then directs a table query about the security solution Cx to the table T in step S3, the table then searching the table entries therefor and outputting the security level SLx of the security solution Cx in step S4. Subsequently, in step S5 the output security level SLx is output to the background system BS1 together with the status of the security solution Cx, i.e. together with the application settings deposited for the security level SLx in the table T. Then, in step S6, a range of functions on the basis of the corresponding application settings is enabled in the end device. Subsequently, the application can be utilized according to the enabled range of functions.

The system is preferably adapted to support a multiplicity of different applications. The background system BS2 as a central place has a security level SLx for each security solution Cx. This association is preferably independent of the application. Independently of a predefined application, an end device or its security solution has exactly one security level SLx. For each security level SLx the background system has for the application an associated application configuration (settings). This association is dependent on the application. Depending on the predefined application, there exists for the ascertained security level SLx an associated application configuration.

The hereinabove described embodiment of the method according to the invention has the advantage that one and the same application can cooperate on different end devices with different security solutions. At the same time, the configuration of the application is carried out while using a central place, so that the application itself need not know the different security levels of the security solutions and the application settings associated with these security levels. This reduces the costs for operating a security infrastructure, and many users with different end devices can use a service on the basis of a suitably configured application without different versions of the applications having to be made available in advance.

The invention claimed is:

1. A method for configuring an application on an end device, the end device having a predefined end device configuration relating at least in part to a runtime environment in which the application is executed with a predefined security level, the application having at least a server portion that runs on a server and an application portion that runs on the end device, the method comprising:
   the end device portion of the application querying an application configuration from a central place, the end device portion of the application providing, in the query, the predefined end-device configuration relating at least in part to the runtime environment in which the end device portion of the application is executed;
   the central place storing a plurality of security solutions associated with each end device configuration, wherein each security solution specifies a runtime environment that controls execution of the end device portion of the application, including controlling different secure runtime environments in the microprocessor of the end device or different hardware security elements of the end device, the security solutions being further associated with a security level that indicates how safe the corresponding security solution is from attacks by unauthorized third parties;
   ascertaining by the central place, in response to the querying, the predefined security level of the predefined end-device configuration relating at least in part to the runtime environment in which the end device portion of the application is executed from the multiplicity of security levels; and
   outputting by the central place to the application on the end device the application configuration associated with the ascertained security level;
   wherein one or several functions of the application executed on the end device are configured on the basis of the output application configuration for the end device by means of the application executed on the end device.

2. The method according to claim 1, wherein the application is configured based on the security level of the end-device configuration.

3. The method according to claim 1, wherein the multiplicity of security levels with associated application configurations are deposited in a table in the central place, the predefined security level of the predefined end-device configuration being ascertained from the multiplicity of security levels of end-device configurations via a table query.

4. The method according to claim 1, wherein the query about the predefined end-device configuration as well as the output based thereon from the central place are transferred via one or several cryptographically secured channels.

5. The method according to claim 1, wherein the end-device authenticates itself with authentication data, the predefined security level being subsequently ascertained in the central place using the authentication data.

6. The method according to claim 1, wherein the application is a distributed application wherein the application runs on the end-device and one remote part of the application runs on a background system communicating with the end-device.

7. The method according to claim 6, wherein the query about the predefined end-device configuration is directed to the central place via the background system.

8. The method according to claim 7, wherein the end-device must authenticate itself on the background system via authentication data before the query directed to the central place via the background system.

9. The method according to claim 1, wherein the presence of the predefined end-device configuration on the end-device and/or the association of the functions of the application configured with the predefined end-device configuration of the end-device are verified by the application, the configuration of the application only being completable successfully upon successful verification.

10. The method according to claim 1, wherein there are configured as the one or several functions of the application a limit of a monetary transaction performable with the application and/or a period of validity of one or several authentication keys of the application and/or the duration of electronic tickets acquirable with the application.

11. The method according to claim 1, wherein the application is a distributed application wherein at least a part of the application runs on the end device.

12. The method according to claim 1, wherein the application is a distributed application wherein at least a part of the application runs on the central place.

13. The method according to claim 1, wherein the application is a distributed application wherein at least a first part of the application runs on the end device and at least a second part of the application runs on the central place.

14. A system for configuring an application on an end-device, the system comprising:
   an end-device having a predefined end-device configuration relating at least in part to a runtime environment in which the application is executed with a predefined security level, the application having at least a server portion that runs on a server and an application portion that runs on the end device;
   a central place in which a multiplicity of security levels of end-device configurations have respective application configurations associated therewith,
   the system being configured to carry out a method including:
   querying an application configuration from a central place, the end device portion of the application providing, in the query, the predefined end-device configuration relating at least in part to a runtime environment in which the end device portion of the application is executed;
   the central place storing a plurality of security solutions associated with each end device configuration, wherein each security solution specifies a runtime environment that controls execution of the end device portion of the application, including controlling different secure runtime environments in the microprocessor of the end device or different hardware security elements of the end device, the security solutions being further associated with a security level that indicates how safe the corresponding security solution is from attacks by unauthorized third parties;

ascertaining by the central place, in response to the querying, the predefined security level of the predefined end-device configuration relating at least in part to a runtime environment in which the end device portion of the application is executed from the multiplicity of security levels;

specifying by the end-device configuration, whose security levels are deposited in the central place, different runtime environments for executing the application on the end device; and outputting by the central place to the application on the end device an associated application configuration relating at least in part to a runtime environment in which the application is executed;

wherein one or several functions of the application executed on the end device are configured on the basis of the output application configuration for the end-device by means of the application executed on the end device.

15. The system of claim 14, wherein the central place comprises at least one table with a multiplicity of security levels of end-device configurations that have respective application configurations associated therewith in the central place, and the central place is configured to process a query about a predefined end-device configuration directed thereto by means of an application such that, in response to the query, it ascertains the predefined security level of the predefined end-device configuration from the multiplicity of security levels, and outputs the associated application configuration to the application.

* * * * *